United States Patent [19] Rimbey

[11] 4,311,991

[45] Jan. 19, 1982

[54] ACOUSTIC TRANSMISSION MEMBER

[75] Inventor: Roger J. Rimbey, Spencer, N.Y.

[73] Assignee: SCM Corporation, New York, N.Y.

[21] Appl. No.: 118,058

[22] Filed: Feb. 13, 1980

[51] Int. Cl.[3] ........................ G06F 3/02; H04L 15/03; H01P 9/02

[52] U.S. Cl. ............................ 340/365 R; 178/17 C; 310/328; 310/334; 333/146; 333/162; 333/193

[58] Field of Search .......... 340/365 R, 365 A, 347 M; 178/17 C; 179/90 K; 365/191, 194; 310/323, 328, 329, 332, 334; 333/148, 146, 162, 163, 193

[56] References Cited

U.S. PATENT DOCUMENTS

| | | | |
|---|---|---|---|
| 2,736,881 | 2/1956 | Booth | 365/191 |
| 2,810,887 | 10/1957 | Ecklund et al. | 333/162 |
| 3,479,572 | 11/1969 | Pokorny | 340/365 A |

FOREIGN PATENT DOCUMENTS

| | | | |
|---|---|---|---|
| 711667 | 9/1931 | France . | |
| 1386070 | 3/1975 | United Kingdom | 340/365 R |
| 2017993 | 10/1979 | United Kingdom | 340/365 R |

OTHER PUBLICATIONS

*IBM Technical Disclosure*, Arosenius, vol. 14, No. 10, Mar. 1972, p. 3199.

*IBM Technical Disclosure*, Lisk, vol. 20, Jun. 1977, p. 259.

*IBM Technical Disclosure*, Booth et al., vol. 20, No. 10, Mar. 1978, p. 4188.

*Primary Examiner*—James J. Groody
*Attorney, Agent, or Firm*—William E. Mear, III; Ernest F. Weinberger

[57] ABSTRACT

An acoustic transmission member is disclosed for use in an encoding system utilizing acoustic energy wherein diverging sound waves are induced within the member in response to selected actuation of a striker positioned along the member. The time taken by each sound wave to travel through the member is measured in the system to provide an elapsed time interval unique to all strikers for generating a code indicative of the selected input. The acoustic transmission member is a rod formed into a series of coils or helixes with at least one coil length provided and when assembled disposed between adjacent striker positions. The coil configuration defines an expanded path, as compared to the straight linear distance between adjacent strikers, for the sound waves to travel. As a result, the elapsed times for adjacent striker positions have a greater spread and resultant insensitivity to tolerance accumulation, thus affording a more reliable encoding process in the presence of variable factors affecting encoding signal readings which are encountered on a mass production basis. Mounting structure in the form of a notched or grooved elongated bar is provided for support of the present acoustic transmission member.

9 Claims, 6 Drawing Figures

FIG. 3
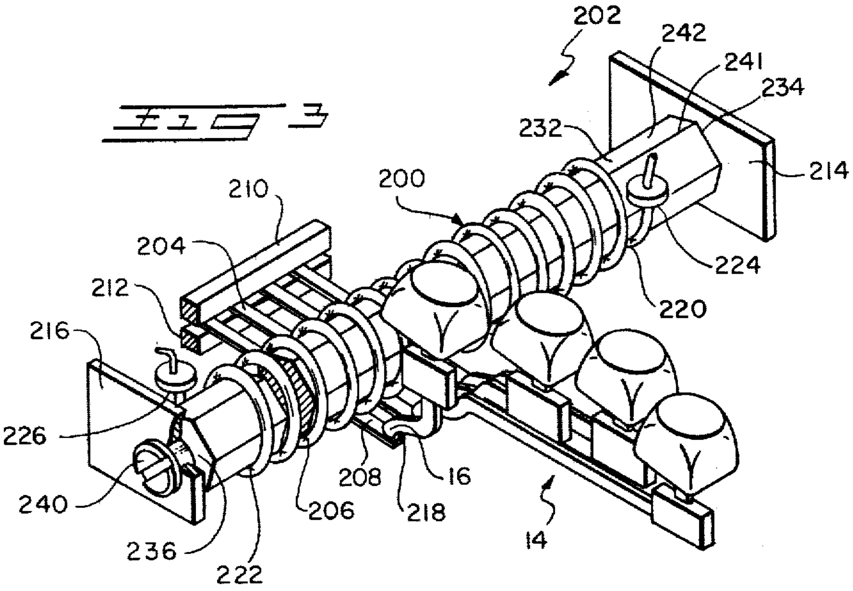
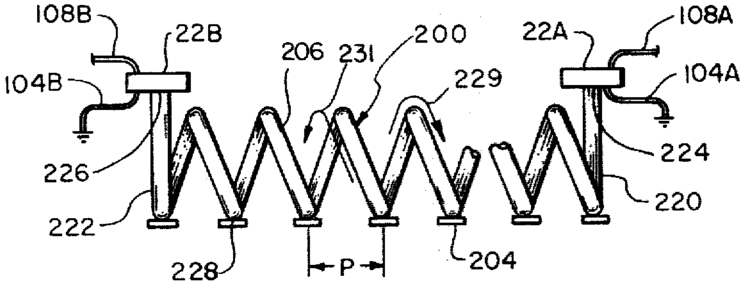
FIG. 4
FIG. 5
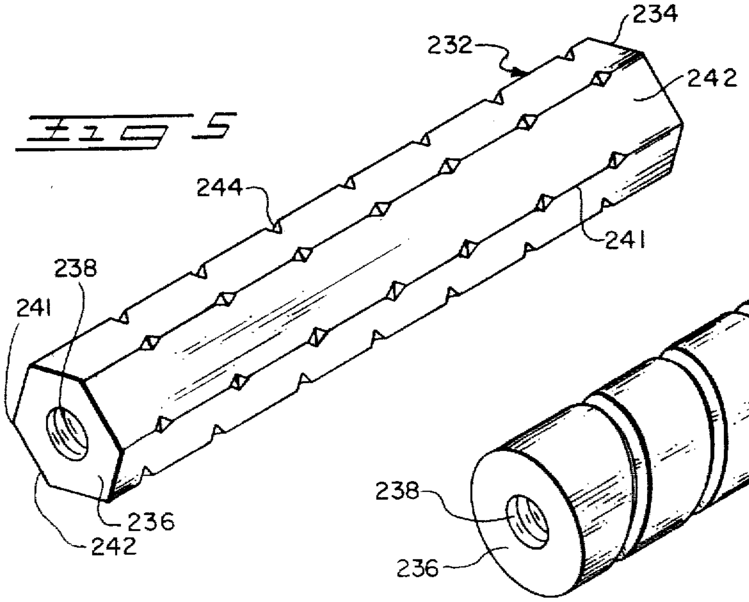
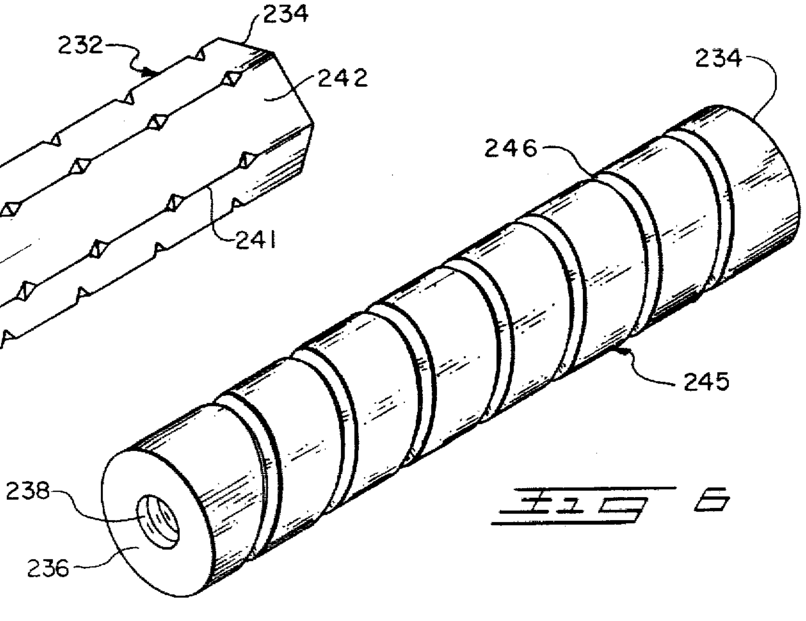
FIG. 6

ACOUSTIC TRANSMISSION MEMBER

BACKGROUND OF THE INVENTION

1. Field of the Invention

This invention relates to apparatus used in an encoding system of the type that utilizes acoustic energy to produce a code representative of a selected keyboard position, for example, in business equipment such as typewriters, teletypewriters, calculators, adding machines, cash registers and the like. More particularly, the present invention relates to acoustic transmission members used to transmit sound waves induced by the key actuated strikers of a keyboard in acoustic encoding systems. The present acoustic transmission member is an improvement over previously known straight acoustic rods disclosed incopending application identified by U.S. Ser. No. 853,778 filed Nov. 21, 1977, now abandoned, entitled "Acoustic Encoding Apparatus" and having the same assignee. To the extent appropriate to the present invention, the disclosure of the above-identified copending application is incorporated herein by reference.

2. Description of the Prior Art

Encoding apparatus for use with many and varied types of equipment have long been known. Most recently, encoding apparatus employ non-mechanical techniques such as electronic components to measure i.e., sound, light or heat and to provide systems capable of meeting modern needs. These encoders successfully enable production of machines that are less bulky, lighter in weight, more economical and reliable. In addition they provide greater operating capabilities in terms of providing more available functions, than machines having primarily mechanical arrangements. Still, there is a continued search for improvements in encoding systems to enhance their economic value and to increase their reliability, especially on a mass production basis.

Encoding apparatus based on acoustic energy and specifically those utilizing sound waves generated from a keyboard input have been briefly disclosed in IBM Technical Disclosure Bulletins including, Arosenius, Vol. 14, No. 10, March 1972 and Lisk, Vol. 20, No. 1, June 1977. More specific approaches are fully disclosed in the above-mentioned copending application U.S. Ser. No. 853,778 (referred to hereinafter as prior application '778, for brevity) and in United Kingdom Pat. No. 1,386,070.

The basic principle employed in acoustic encoding apparatus of the type mentioned is to provide an output, usually in the form of a code, established by measuring the elapsed time between diverging sound waves induced at a point of origin within an acoustic member in response to actuation of a selected key. Devices to measure the elapsed times comprise a counting device to define the time interval between arrival of the diverging sound waves at spaced sensing elements connected to each end of the acoustic member. The elapsed time for each striker position along the acoustic member is unique and the code produced is adaptable to control operation of the machine according to the key selected.

While a considerable improvement in the art of encoders has taken place, prior art acoustic keyboards have encountered significant limitations. Though in theory a unique elapsed time is presented for each striker positioned along the acoustic member, these times are subjected to tolerance factors other than those in devices used to measure the time interval that may affect accurate code response. For example, it has been found that acoustic encoders are sensitive to variations in the acoustic properties of the material selected for construction of the acoustic transmission member. These variations undesirably affect the velocity at which sound waves are transmitted through the member. The acoustic encoding process is fixed or pre set with respect to the code generated in response to the actual measured elapsed time. A significant accumulation of tolerances in the system causes an excessive interval beyond the established time between signals such that a false code is generated. A false code possibility is realized moreover upon a study of a keyboard layout which typically includes at least one straight row of keys in proximal relationship. Each actuator operates a striker to impact the acoustic transmission member and thereby induce within the member diverging sound waves. The strikers are arranged in a side-by-side relationship according to the spacing among keys of the particular keyboard. The acoustic transmission member disclosed in the prior art is straight and traverses the row of strikers. Consequently, prior art acoustic encoding systems must accurately distinguish elapsed times within a range fixed by the spacing between proximal strikers in a straight row.

SUMMARY OF THE INVENTION

It can be appreciated that acoustic tolerances in encoding systems are difficult and costly to minimize or eliminate. The present invention sets forth an improved acoustic transmission member fabricated in such a manner that, even though the strikers remain in the same proximal locations, the elapsed time generated by each striker is extended, thus enabling the encoding process to be readily accomplished at all times irrespective of any tolerance accumulation in the system. The present acoustic transmission member is especially suited for use in the acoustic encoding apparatus of prior application '778.

The present acoustic transmission member comprises a rod formed into many curved portions, preferably shaped in a series of helixes or coils. At least one coil length is provided intermediate adjacent proximal striker positions with corresponding points along the coil rod situated to receive an impact blow from each striker. As a result of the sharp blow, sound waves are induced and travel in diverging directions within the rod along a path defined by the coiled configuration. Transducers operatively connected to the rod convert the sound waves into signals (electrical) with an elapsed time therebetween determined by the difference in distance each diverging wave is forced to travel along its winding path. By comparison, the acoustic path provided by the coils from one striker position to the next is substantially greater in length than the recti-linear distance provided by the straight rod of prior application '778. Likewise, elapsed times associated with each striker position are increased an amount sufficient to accomodate greater time intervals occasioned by acoustic tolerances. Thus, the time-responsive components operatively connected to the transducers are permitted a sufficiently large range of time interval to accurately distinguish tolerance distorted signals.

Another feature of the present invention is to provide structure for supporting the coiled acoustic transmission member in the encoding keyboard. One support structure embodiment includes an elongated bar having a hex-shaped cross-section. The bar extends through all the coils and beyond for rigid mounting to keyboard end plates. Notches positioned along the bar seat the coils to restrict sideways displacement and to align one coil opposite each striker. An alternative shape for the support structure is a circular shaft having a helical groove along its length for purposes set forth above with respect to mounting the coil rod. Each embodiment of the support structure is preferably constructed from a synthetic material for isolatingly supporting the coil rod.

It is, therefore, an object of the present invention to provide an improved acoustic transmission member for use in an acoustic encoding system.

Another object of the present invention is to provide an acoustic transmission member that enables a reliable encoding process to occur in the presence of acoustic variables.

Still another object of the present invention is to provide an acoustic transmission member that is simple in construction, economical to manufacture, easily assembled and readily adaptable for use in existing acoustic encoding systems.

Other objects, features and advantages of the invention will become more apparent from the following description, including appended claims and accompanying drawing.

DESCRIPTION OF THE DRAWING

FIG. 3 is a perspective view showing an acoustic transmission member according to the invention assembled in the acoustic encoding system of FIG. 1 as a replacement for the straight acoustic rod therein.

FIG. 4 is a front elevational view of the invention showing the relationship of the transmission member's coils to sound inducing strikers.

FIGS. 5 and 6 are perspective views showing different embodiments of support structure for the acoustic coil rod.

DESCRIPTION OF THE PREFERRED EMBODIMENT

Figure 1:
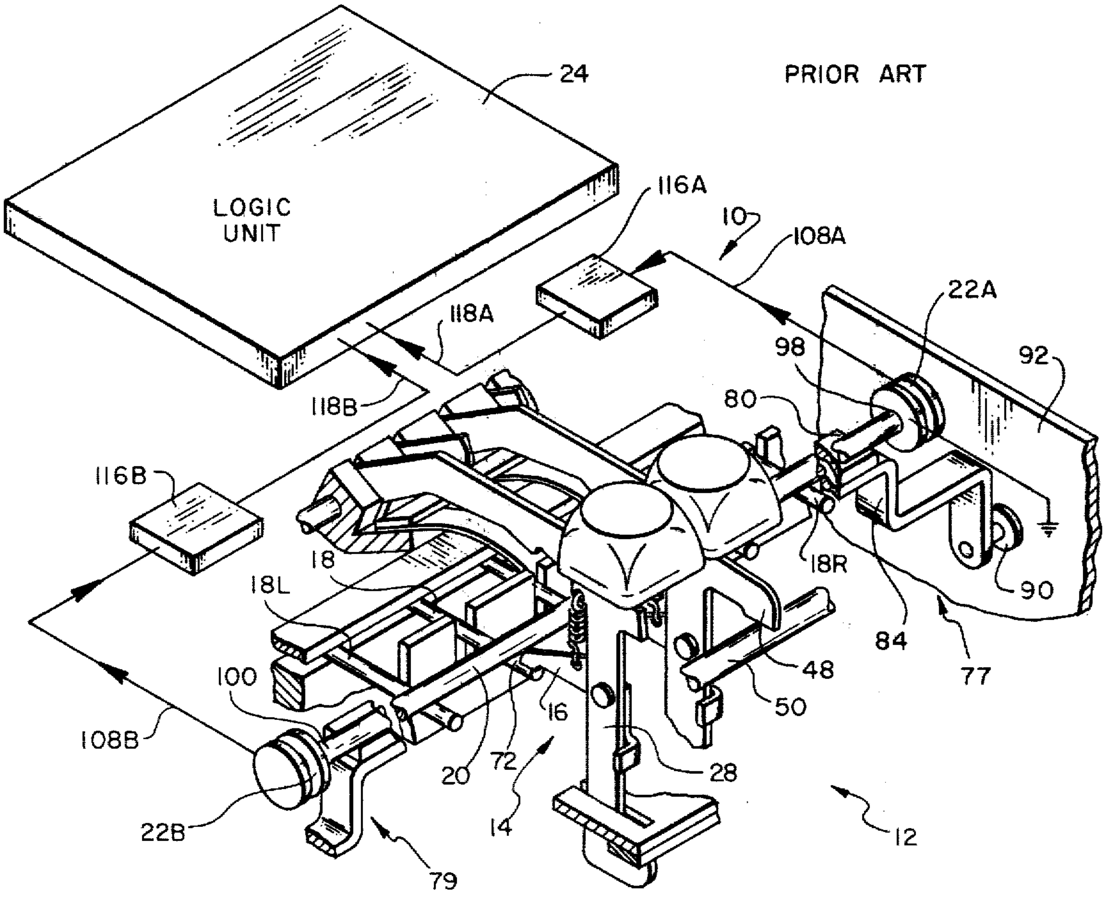
FIG. 1 is a perspective view showing an acoustic encoding system having a straight acoustic rod as disclosed in prior application '778.

The present invention is best understood and its advantages are fully appreciated with an overall basic understanding of the operation of a suitable acoustic encoding system in which the present invention is utilized. The acoustic encoding system referred to is based on measurements of acoustic energy, particularly sound waves, wherein time-responsive components measure elapsed time between divergent sound waves traveling within an acoustic transmission member to produce an output representative of the position of a selected input device. One such acoustic encoding system is fully disclosed in the aforementioned co-pending prior application '778. For purposes of clarity, a brief description of prior application '778 is given below with reference numerals appearing in FIGS. 1 and 2 corresponding to those used in the previous application.

DESCRIPTION OF ACOUSTIC ENCODING SYSTEM

Referring now to FIG. 1, there are shown the basic operating elements comprising the acoustic encoding system 10. A keyboard 12 includes an arrangement of key mechanisms 14 for selecting initiation by operator inputs. Each key mechanism 14 has a depressably mounted keylever 28 that carries an actuator 16 for operative engagement with an opposing resilient striker 18. There is provided at least one striker 18 associated with each key mechanism 14, all strikers 18 being mounted with equal spacing longitudinally along the keyboard 12. At rest, actuator 16 overlaps free end 72 of striker 18 for engagement therewith upon initial downward movement of keylever 28, causing striker 18 to deflect. Prior to full depression of keylever 28, limited by a stop arm 48 abutting a rigid downstop 50, striker 18 is released from engagement with actuator 16 due to the relative arcuate movement relationship therebetween. The released striker 18 then snaps or flicks upward toward its initial rest position.

An acoustic member 20, in the form of an elongated straight rod, is positioned above and substantially perpendicular (orthogonal) relative to free end 72 of strikers 18. As a result of the snap action, a sharp blow is received by the member 20 inducing acoustic energy in the form of diverging sound waves. At rest, striker 18 contacts member 20 to provide a slight bending load which tends to reduce bounce of striker 18 after impacting rod 20.

A pair of supports 77 and 79, located near one of the ends 98, 100 of member 20, are provided and each includes a buffer pad 80 secured on a bracket 84 extending through a grommet 90 mounted on end frame plates 92 (only one shown). This support arrangement acoustically isolates member 20 from external effects such as motor vibration or environmental shocks.

As mentioned, the sharp blow to member 20 induces sound waves that propagate in opposite directions within member 20. The straight length of member 20 defines a path for these sound waves to travel. Each sound wave passes through the member 20 at a substantially constant velocity towards ends 98, 100.

Located at each end 98, 100 of rod 20 is a transducer 22A and 22B, respectively. These transducers 22A, 22B are electromechanical devices for converting sound energy, i.e., sound waves, into electrical energy, i.e. signals, adapted for passage along connected lines 108A and 108B, respectively. The transducers 22A, 22B sense the arrival of the respective propagating waves. The positioning of each striker 18 relative to the transducers 22A, 22B is such that the diverging sound waves induced by any particular striker 18 position each travel different distances and therefore do not arrive at their respective transducers simultaneously. Accordingly, the sound waves are transduced at different times, for example with the first appearing signals on each line 108A, 108B (corresponding to the wave front of the respective wave) having a calculable known time interval or elapsed time therebetween.

The electric signals on lines 108A and 108B are applied to signal conditioning circuitry depicted by boxes 116A and 116B, respectively. Each conditioning circuitry 116A, 116B modifies the incoming low level signals to a relatively constant amplitude series of pulses compatible for use by ensuing electrical elements.

A logic unit 24 receives the modified signals from each signal conditioning circuitry 116A, 116B via connecting lines 118A and 118B. A primary purpose of logic unit 24 is to measure the elapsed time between spaced signals and then to provide a code indicative of the actuated striker 18 through the operation of time-responsive components outlined below.

Figure 2:
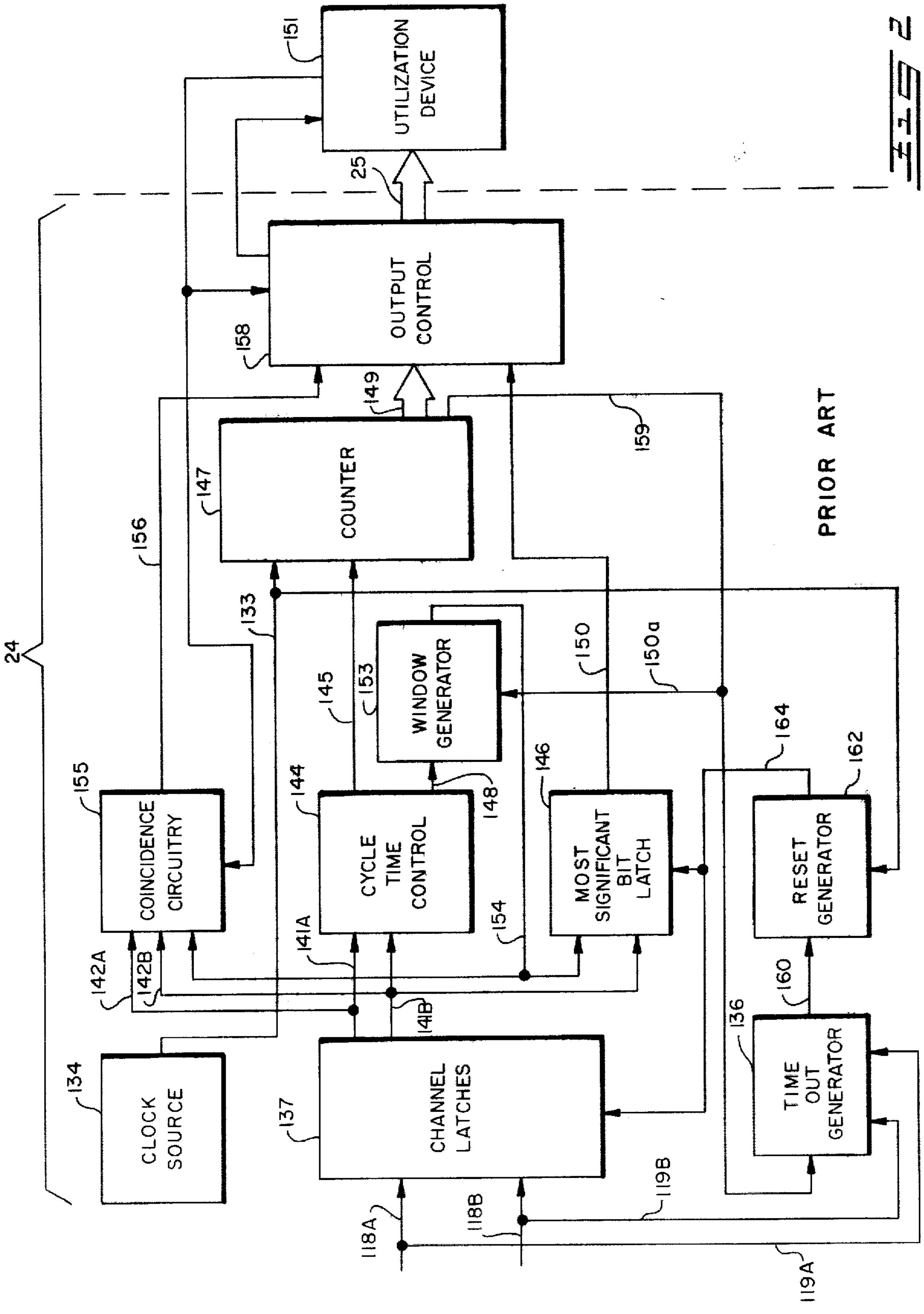
FIG. 2 is a block diagram of the logic portion of the elapsed time system of FIG. 1.

In the block diagram of FIG. 2 there are illustrated electrical operating components assembled within logic unit 24 of FIG. 1. A more detailed description of correspondingly numbered components is discussed in the aforementioned prior application '778. The arrangement of FIG. 2 is by way of example, a convenient way of generating output information based on measurement of elapsed time in a preferred binary form adaptable for use to control the functions of many and varied electronic devices, such as computers, calculators and, more recently, typewriters.

In FIG. 2, the first arriving or "leading" signal from either line 118A or 118B causes the setting of a related latch contained in Channel Latches 137. This occurrence causes the incoming pulsating signals to be converted to a constant logic level output from Channel Latches 137. Simultaneously, through lines 119A, 119B tapped from lines 118A, 118B and connecting to a Cycle Time Out Unit 136, the signal inhibits operation of unit 136 (until a later time). The logic levels from the Channel Latches 137 appear on output lines 141A, 141B, the first to appear (either line) initiates a cycle of the logic unit 24 by activating a Cycle Time Control Unit 144, causing it to emit signals on its output lines 145 and 148. Line 145 is connected to a Counter 147 which begins counting reference pulses upon receipt of the signal via line 145. The reference pulses are supplied on a line 133 at a rate determined by a free running Clock Source 134. Line 148 from Cycle Time Control Unit 144 leads to a Window Generator 153 for emission of a delayed signal or continual level change on line 154 upon arrival of the signal on line 148. Line 154 proceeds to Coincidence Circuitry 155 and to the Most Significant Bit Latch 146. When a signal appears on line 154, it enables the Coincidence Circuitry 155 to respond to signals on lines 142A, 142B tapped into the output lines 141A, 141B from the Channel Latches 137 and when both these last are set, indicating termination of elapsed time, i.e. arrival of second signal a level appears on line 156 at the output of Coincidence Circuitry 155, to transfer the status or count of Counter 147 at that instant into an Output Control 158 via counter bus lines 149. The status of the Most Significant Bit Latch 146 is also determined at the same time, and likewise transferred into Output Control 158 via output line 150 from latch 146. A code, the counter output, in this case is then stored and made available for transfer along lines 25 for display or recording in a utilization device 151 or for control of such device. The Counter 147 is allowed to continue counting up to a predetermined maximum value. Once Counter 147 reaches this maximum value, a signal is emitted along line 159 in order first to reset the Window Generator 153 via line 150*a*, thereby removing the enabling signal on line 154, and second to trigger the Cycle Time-Out Generator 136 which if there are no pulses on either line 119A or 119B, as more fully explained in the '778 application, will cause an output signal on line 160. This signal triggers a Reset Generator 162, causing it to issue a "clear" pulse along line 164 connected to the Channel Latches 137 and Latch 146. This "clear" pulse marks the end of the cycle within Logic Unit 24.

DESCRIPTION OF THE PROBLEM

Having described the basic elements and operation of a suitable encoding system 10 utilizing acoustic energy, the present invention provides a needed improvement over such systems with respect to providing an acoustic transmission member configurated to expand available elapsed times associated with all similarly arranged strikers 18. It was discovered that while the abovementioned acoustic encoding system 10 is reliable for such purposes in theory and in the laboratory, accumulation of tolerances make reliability marginal on a mass production basis.

The tolerance sensitivity of an acoustic member such as rod 20 stems mainly from factors causing variations in the velocity of propagating acoustic waves as they travel within the rod 20. The variations are a result of changes in temperature in different environments and differences in the acoustic properties of like materials in a lot-to-lot, or for that matter a rod-to-rod, basis. Other factors attributed to the operative efficiency of known acoustic encoding systems include acoustic dispersion (i.e. changes in transducer signal rise time with distance from the strike point), electronic threshold drift, reference frequency drift, shifting impact point, wear at the impact point and timer resolution. These factors, though individually having little effect, must be considered collectively in the design of the system. Accordingly, a range or time span pre-established within Logic Unit 24 to correctly identify a second arriving (i.e. "following") signal as valid must be of sufficient duration to allow for maximum variations causing signal delay, with some further allowance as a factor of safety. One of ordinary skill in the art will recognize that some of the components in Logic 24 of FIG. 2 (e.g. Counter 147 with respect to its capacity, fully described in aforementioned prior application '778) can be readily modified or adjusted to accommodate a count corresponding to expanded elapsed times and to generate a code accordingly.

One problem in attempting to design a mass-producible reliable acoustic encoding system is the physical limitations imposed by the external dimensions of business machines. The overall size of such, e.g. typewriters and calculators, are traditionally established with a tendency toward being more compact. The length of the straight acoustic rod 20 is thus restricted to one which fits within machine boundaries. Consequently, the proximal spacing of strikers 18 along the rod 20 is limited and up until now has yielded little flexibility in approaches attempting to increase the elapsed times.

As a calculated example, consider a typewriter keyboard wherein the number of keys is greater than thirty-two but less than or equal to sixty-four. In FIG. 1, assuming the distance between extreme end striker positions 18L and 18R to be eight inches with sixty-two equally spaced strikers disposed therebetween. The spacing is calculated to be approximately 0.127 inches between any two strikers 18. Further, let it be assumed that rod 20 is made of steel, in which sound travels with a velocity of approximately 0.2 inch per microsecond. Accordingly, the elapsed time differential between any adjacent striker positions along the linear rod 20 is calculated to be approximately 0.635 microsecond. In other words, the time span afforded in the prior art to correctly distinguish unique elapsed times for each striker 18 position is a little more than half a microsecond.

Tests have shown that following signals may arrive outside their allotted time spans, thereby generating an erroneous or false code caused by an overlapping of the following signal into a time slot designated for the next striker 18. These errors are believed to be caused by the above-mentioned substantially uncontrollable variations in the acoustic encoding system.

INVENTIVE SOLUTION TO THE PROBLEM

Referring now to FIG. 3, there is shown a first embodiment of an improved acoustic transmission member 200 for use in an acoustic encoding system 202. The system 202 is similar to previously described acoustic system 10 of FIG. 1. Therefore, only a portion of the system 202 is illustrated wherein like elements have retained their reference numerals and to distinguish the new items, these have been referenced with numbers beginning with 200.

To solve the previously discussed problem, acoustic member 200 is a metal rod formed with multiple curved portions so as to provide a path for the transport of induced sound waves greater than the linear distance between any combination of serially arranged inducing strikers 204. Rod 200 is preferably spiral-wound into a series of connected loops or coils 206. There is provided at least one full coil 206 associated with each one of the strikers 204. For a greater transport length from one striker 204 to the next, a second or more coils may, however be disposed intermediate each striker 204 location.

In the illustrated embodiment of FIG. 3, strikers 204 comprise resilient flat fingers 208 mounted in cantilever fashion between rigid bar members 210 and 212 which in turn are firmly supported on end frame plates 214 and 216. Each finger 208 extends in a forward direction from where mounted to pass beneath and preferably in contact with an aligned coil 206 and terminates in a free end 218.

Previously described key mechanism 14, illustrated in part in FIG. 3, is provided as a suitable means for deflecting free end 218 to induce propagating sound waves upon impact with member 200. Each key mechanism 14 operates to engage, deflect and release a striker 204 to initiate an input within the acoustic system 202.

In FIG. 4 the coiled acoustic transmission member 200 is shown partially removed from the encoding system 202. End coils, 220 being the extreme right and 222 the extreme left, are formed to project substantially upright. Uppermost tips 224 and 226 of each coil 220, 222, respectively, are ground flat perpendicular to the axis of the upstanding rod. The first transducer 22A is located and firmly affixed on coil tip 224 with a strong adhesive such as "Eastman 910". The second transducer 22B is located and likewise mounted on the other tip 226. These transducers 22A, 22B are piezoelectric discs and, together with the electrical signals produced, are more fully described in the above-identified prior application '778. Each transducer 22A, 22B is solder-connected on one side to the respective line 108A, 108B for passage of electrical signals converted by the transducers 22a, 22B. The lines 108A, 108B lead to logic circuitry (not shown) for encoding analysis of carried signals. Typically, ground leads 104A and 104B are provided and solder-connected to the other side of each transducer 22A, 22B.

As shown in FIGS. 3 and 4, strikers 204 are arranged in a proximal, equally spaced side-by-side manner along the transmission member 200 and in vertical alignment with their associated key mechanism 14. Preferably, the coil rod member 200 is wound such that its pitch length P from a point on one coil 206 to a corresponding point on the next succeeding coil 206 is equal to the longitudinal spacing distance between adjacent strikers 18. Thus, a contact point 228 is established at the lower most portion of each coil 206. Strikers 204 are flat (in this application) to allow some slight sideways missalignment between contact point 228 and striker 204 without sacrifice of the orthogonal relationship therebetween.

As in the operation described in prior application '778, upon depression of a key mechanism 14, its arm 16 engages free end 218 of resilient striker 204. At almost full depression of the key mechanism 14, free end 218 slips out of engagement and springs upward striking coiled member 200 at the aligned contact point 228. As a result of the sharp blow from striker 204, sound energy in the form of sound waves is induced within the member 200. These sound waves diverge from contact point 228 and propagate along the path illustrated by arrows 229 and 231 defined by the member 200 toward transducers 22A and 22B.

The propagating sound waves tend to travel in a substantially linear direction away from the point of impact at a constant velocity. The waves are substantially confined within the material boundaries of coils 206 which function as a sound corridor along member 200, since the advancing sound waves are continually being reflected along the curved boundaries of each coil 206. Reflection of the sound wave causes distortion. However, the leading edge or first half-cycle is the least distorted. As fully described in the aforementioned application '778, the first half-cycle alone is all that is actually necessary for proper operation of the acoustic encoding system 10 disclosed therein. Ensuring distorted waves received by the transducer 22A or 22B only affect the repetition rate of the output along lines 108A and 108B over the duration of the sound wave.

From the foregoing description, it is easily appreciated that the present coil transmission member 200 provides a path (229, 231) for transmitting sound waves, particularly from one striker 204 to the next, greater in length than the straight linear path between longitudinally arranged inducers as provided by previously known acoustic transmission members, such as rod 20 in the prior application '778. Consequently, the elapsed time value for each striker 204 position is increased over those values of the prior art for correspondingly spaced acoustic inducing devices. These expanded elapsed times enable a suitable logic unit, similar to logic 24, to accept and readily identify second arriving signals that may have been delayed as a result of the inherent aforementioned variables.

In construction of the present coiled member 200, applicant has noted few restrictions with respect to cross-sectional size and shape. The primary limitation restricting cross-sectional size is the spacing gap between adjacent strikers 204. For example, member 200 is preferably a circular rod whose diameter is slightly less than the spacing gap between strikers 204 to avoid acoustic coupling by side engagement between the coils 206. It should be noted, applicant believes other cross-sectional profiles such as, e.g. square, rectangular would work equally well for the rod stock chosen for the present invention. Although the material composition of rod 200 is not critical, the following characteristics are present. Rod 200 must be capable of transmitting and propagating sound energy when struck, for example, upon impact by striker 204. Rod 200 must further be capable of sustaining sound energy in the form of sound waves within itself and transmitting these in divergent directions at a predeterminable, substantially constant velocity. In addition, rod 200 must be capable of being arcuately formed into shapes such as coils 206, and once so formed must substantially retain its configuration. For the embodiment of this invention, circular rod 200 is made of steel and has a cross-sectional diameter of approximately 1/16 inch, with the striker 204 spacing in excess of 1/16 inch.

In helical-winding of rod 200, the outer diameter of the coil loop 206 is limited primarily by the need to avoid acoustic coupling to surrounding structures. Coils 206, like those of a coil spring, are preferably formed by winding about a mandrel of a suitable size. Alternatively, rod 200 may be formed in other suitable configuration to provide extended path lengths for the sound waves to travel between adjacent strikers 204, e.g. could be sinusoidal etc. and flat.

In FIGS. 3 and 4, the strikers 204 are illustrated preferably arranged in a row along the bottom of rod 200. Other arrangements of the strikers 204 about rod 200 are possible e.g.—along the top—in alternating fashion at the top and bottom—or other locations about the rod 200 so long as the acoustic path through portions of the coil 206 is greater in length than the linear straight distance between adjacent strikers 204.

In FIGS. 3 and 5, there is illustrated a first preferred embodiment of a support structure used in conjuncton with the present acoustic coil member 200. The support structure comprises an elongated bar 232 somewhat longer than the coil member 200. Each end 234, 236 of bar 232 is flat for face-to-face abutment with the inner surface of end plates 214 and 216. A threaded aperture 238 (FIG. 5) is centrally located on each end face 234, 236 to receive a screw means 240 for attachment and horizontal support of the bar 232 between end plates 214 and 216. Bar 232 is preferable of ridged plastic such as commonly available registered nylon, or other synthetic material capable of affording sufficient acoustic isolation in terms of preventing acoustic energy from being induced by external effects such as motor vibration or environmental shock from being coupled to member 200. For the embodiment of FIG. 5, bar 232 is hex-shaped in cross-section. Hex bar 232 is sized such that the measurement across opposing peaks 241 is slightly larger than the inside diameter of the coils 206 and the span across opposing flats 242 is slightly less than the inside diameter of the coil 206.

For mounting coiled member 200 on the hex bar 232, each peak 241 is provided with a series of recesses in the form of a V-notch 244. The longitudinal spacing of V-notches 244 along each one of the peaks 241 is equal to the pitch P of the coiled member 200. The V-notches are placed along the respective peaks 241 so as to properly fit and accomodate the member 200. As seen in FIG. 3, each coil 206 is engaged to sit slightly within a V-notch 244 as the coil 206 passes over each peak 241. Once assembled, accomplished in a thread-like manner, in the seated position, axial movement of each coil 206 along hex bar 232 is restricted. The contact point 228 on each coil 206 (see FIG. 4) is thus firmly held in vertical alignment with its opposing striker 204.

Referring now to FIG. 6, there is shown a second embodiment for a support structure comprising an elongated circular shaft 245. The material and the manner of mounting shaft 245 corresponds to that explained above in connection with the hex bar 232 of FIGS. 3 and 5. A V-shaped groove 246 is cut about the axis of shaft 245 and extends along the shaft length in helical fashion. The outside diameter of shaft 245 is slightly larger than the inside diameter of the coiled member 200. The development of the helical V-groove 246 corresponds to the coiled member 200 with respect to pitch P so that assembly of the member 200 on the shaft 245 positions each coil 206 in two-point engagement within V-groove 246. Thus, the assembled coiled member 200 is axially restrained on the shaft 245 to position contact points 228 of each coil 206 in operative alignment with strikers 204.

The "V" construction of notches 244 and groove 246 provide a reduced surface contact between the coil member 200 on support member 232 or 245 in a manner so as to minimize acoustic coupling. Other equally satisfactory shapes may be applied to notches 244 and groove 246 that provide minimal supportive contact between the coil member 200 and one of the support members 232 or 245.

In summary, by forming an acoustic transmission member in accordance with the foregoing description the member will be capable of providing expanded elapsed times for each key position enabling the encoding process to be readily accomplished.

It should be understood, of course, that the foregoing disclosure relates only to preferred embodiments of the invention and that modifications or alterations may be made therein without departing from the spirit and the scope of the invention as set forth in the appended claims.

What is claimed is:

1. An acoustic transmission member for use in an encoding system of the acoustic type, said system having a plurality of acoustic energy inducing devices arranged in a side by side relationship along said member for inducing acoustic energy at a selected position along said member, the induced acoustic energy in the form of sound waves having propagating wave fronts traveling in diverging directions within said member, spaced apart transducer means operatively connected to said member for sensing and converting the received wave fronts into output signals having an elapsed time therebetween as determined by the difference in distance each wave front travels, the improvement comprising:

said member being formed to have a path length between adjacent inducing devices greater than the shortest linear distance between said adjacent inducing device for increasing the elapsed time between said adjacent inducing devices.

2. The acoustic transmission member according to claim 1, wherein said member is an elongated rod traversing said inducing devices, said rod having a plurality of curved portions along the length thereof with at least one curved portion positioned between adjacent inducing devices.

3. The acoustic transmission member according to claim 2, wherein said plurality of curved portions comprise a series of connected loops.

4. The acoustic transmission member according to claim 3 further comprising:

a bar positioned coaxially within and in engagement with a portion of said series of connected loops for supporting said member.

5. The acoustic transmission member according to claim 4, wherein said bar is made from an acoustically isolating plastic.

6. The acoustic transmission member according to claim 5, wherein said bar is hexagonal in cross section.

7. The acoustic transmission member according to claim 5, wherein said bar includes restraining means cooperating with said series of connected loops to prevent lateral movement thereof relative to said member.

8. The acoustic transmission member according to claim 7, wherein said restraining means comprises a plurality of notches on said bar, said notches engaging a portion of said series of connected loops.

9. The acoustic transmission member according to claim 7, wherein said bar is a circular shaft and said restraining means is a continuous helical groove on said shaft, said series of connected loops being seated in said groove.

* * * * *